June 22, 1926.
D'ORSAY McC. WHITE
BRAKE
Filed Oct. 1, 1925
1,589,497
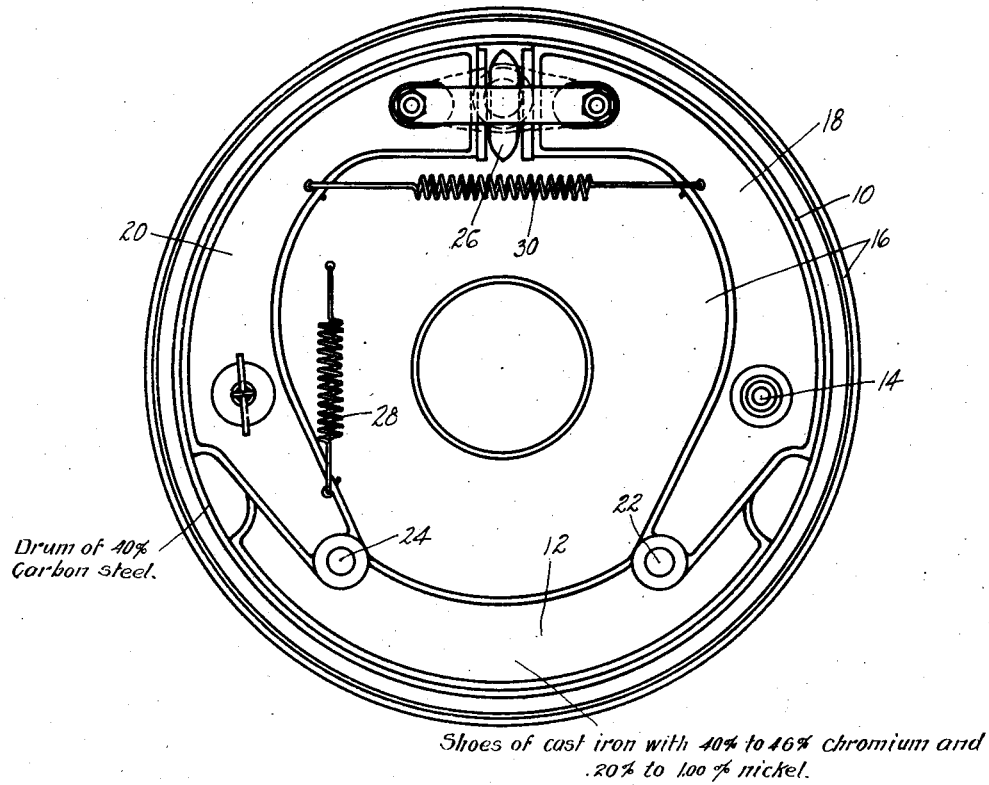
Drum of 40% Carbon steel.
Shoes of cast iron with 40% to 46% chromium and .20% to 1.00% nickel.
INVENTOR
D'ORSAY McCALL WHIT
BY
*M. W. McConkey*
ATTORNEY Patented June 22, 1926.

1,589,497

UNITED STATES PATENT OFFICE.

D'ORSAY McCALL WHITE, OF CHICAGO, ILLINOIS, ASSIGNOR, BY MESNE ASSIGNMENTS, TO BENDIX BRAKE COMPANY, OF CHICAGO, ILLINOIS, A CORPORATION OF ILLINOIS.

BRAKE.

Application filed October 1, 1925. Serial No. 59,804.

This invention relates to brakes, and is illustrated as embodied in a three-shoe internal expanding automobile brake of a well-known type. An object of the invention is to eliminate the usual brake lining, which is expensive and not very durable, and which is apt to squeal when the brake is slightly out of adjustment.

This is accomplished by the use of novel brake shoes which, at least on their friction faces, are made of cast iron, preferably containing a .40% to .46% chromium or .20% to 1.00% nickel (or both), and which engage a high carbon steel drum. I prefer that the drum, or its friction face, should contain approximately .40% carbon. The hardness of the drum should be about 207 to 250 Brinell, and of the shoes about 192 to 202 Brinell.

These and other objects and features of the invention will be apparent from the following description of the brake illustrated in the accompanying drawing, in which:

The figure is a vertical section through the brake, taken just inside the wheel, and showing the brake shoes in side elevation.

The brake illustrated includes a drum 10, within which are arranged a central shoe 12 anchored at 14 on a backing plate 16, and end shoes 18 and 20 pivoted to the central shoe 12 at 22 and 24. The shoes are forced against the drum to apply the brake by a cam 26 against the resistance of return springs 28 and 30.

According to the present invention, at least the friction face of the drum 10 is of approximately .40% carbon steel, having a Brinell hardness of approximately 207 to 250, while at least the friction faces of the shoes 12, 18 and 20 are of cast iron (carbon 3.30% to 3.45%), preferably containing approximately .40% to .46% of chromium and .20% to 1.00% of nickel.

This gives a very durable brake having a better co-efficient of friction than ordinary lining, and without any tendency to "squeal".

While one form of the invention has been described in detail, it is not my intention to limit its scope to that particular form, or otherwise than by the terms of the appended claims.

I claim:

1. A brake having, in combination, a drum having a friction part of carbon steel, and shoes having friction parts engageable therewith and made of cast iron containing nickel and chromium.

2. A brake having, in combination, a drum having a friction part of approximately .40% carbon steel, and shoes having friction parts engageable therewith and made of cast iron containing approximately .40% to .46% of chromium.

3. A brake having, in combination, a drum having a friction part of approximately .40% carbon steel, and shoes having friction parts engageable therewith and made of cast iron containing approximately .20% to 1.00% of nickel.

4. A brake including rotatable and non-rotatable frictionally-engaging members, one of carbon steel, and the other of cast iron containing approximately .40% to .46% of chromium.

5. A brake including rotatable and non-rotatable frictionally-engaging members, one of carbon steel and the other of cast iron containing approximately .20% to 1.00% of nickel.

6. A brake including rotatable and non-rotatable frictionally-engaging members, one of high carbon steel and the other of cast iron containing nickel and chromium.

In testimony whereof, I have hereunto signed my name.

D'ORSAY McCALL WHITE.